(12) United States Patent
Knoop

(10) Patent No.: US 6,653,010 B2
(45) Date of Patent: Nov. 25, 2003

(54) FUEL CELL SYSTEM

(75) Inventor: Andreas Knoop, Lenningen/Hochwang (DE)

(73) Assignee: Ballard Power Systems AG, Kirchheim-Nabern (DE)

( * ) Notice: Subject to any disclaimer, the term of this patent is extended or adjusted under 35 U.S.C. 154(b) by 223 days.

(21) Appl. No.: 09/822,843

(22) Filed: Apr. 2, 2001

(65) Prior Publication Data

US 2002/0009629 A1 Jan. 24, 2002

(30) Foreign Application Priority Data

Mar. 31, 2000 (DE) .......................................... 100 16 185

(51) Int. Cl.⁷ ............................................... H01M 8/04
(52) U.S. Cl. .............................. 429/34; 429/22; 429/25
(58) Field of Search ............................... 429/22, 23, 24, 429/25, 34, 38, 39

(56) References Cited

U.S. PATENT DOCUMENTS 6,338,912 B1 * 1/2002 Ban et al. ...................... 429/34
6,361,890 B1 * 3/2002 Ban et al. ...................... 429/25

FOREIGN PATENT DOCUMENTS

DE     43 22 767 C2     8/1993
JP     3-100398     * 4/1991     ............ H01M/8/04

* cited by examiner

Primary Examiner—Stephen Kalafut
(74) Attorney, Agent, or Firm—Seed IP Law Group PLLC

(57) ABSTRACT

In a fuel cell system, and a method of operating a fuel cell system comprising a fuel cell unit and an air supply for providing a fuel for the fuel cell unit, a compressor having a variable internal compression ratio is provided for media delivery in the gas generation system.

8 Claims, 1 Drawing Sheet

FUEL CELL SYSTEM

BACKGROUND AND SUMMARY OF THE INVENTION

This application claims the priority of German patent document 100 16 185.5, filed Mar. 31, 2000, the disclosure of which is expressly incorporated by reference herein.

The invention relates to a fuel cell system having an air supply for providing fuel to a fuel cell unit, and to a method of operating such a fuel cell system.

In methanol-fuelled fuel cell driven vehicles in particular, cold starting of the system requires a relatively large amount of energy, which generally must be provided by the vehicle battery. In the cold-start phase, a large electrical output is required particularly by the electricity supply of the gas generation system for providing the hydrogen gas for the fuel cell. A fuel cell system of this type is disclosed, for example, in German patent document DE-C2 43 22 767.

It is an object of the invention to provide a fuel cell system and a method of operating it, which reduces energy consumption in the event of a cold start.

This and other objects and advantages are achieved by the fuel cell system and method according to the invention in which a compressor having a variable internal compression ratio is used to supply the cathode side of a fuel cell with air. This arrangement allows compressor operation to be tailored to the different requirements during cold start and normal operation, so that energy consumption is improved and annoying noise emissions can be avoided.

Other objects, advantages and novel features of the present invention will become apparent from the following detailed description of the invention when considered in conjunction with the accompanying drawings.

DETAILED DESCRIPTION OF THE DRAWINGS

The invention is particularly suitable for the cathode air supply in fuel cell systems in mobile installations, in which a fuel for the fuel cell unit is produced from a hydrogen-containing medium by means of a gas generation system, or alternatively in fuel cell systems which are supplied from a hydrogen reservoir. The invention is described herein with reference to a fuel cell system comprising a gas generation system and a PEM fuel cell unit, but is not limited to such systems.

In a conventional fuel cell system of this type, a gas generation system supplies a fuel cell unit with fuel, preferably hydrogen. The fuel cell unit consists of one or more fuel cells which are preferably electrically interconnected in such a way that it is able to provide the electrical power, (e.g., for driving a vehicle). Associated with the gas generation system is a compressor which compresses an oxygen-containing medium, preferably air, and supplies it to the gas generation system and/or the fuel cell unit, for combustion. Oxygen is required both by the fuel cell unit, as a cathode air supply, and in the gas generation system for various oxidation processes (e.g., for CO oxidation, for partial oxidation, for catalytic burners and the like).

In a methanol-fuelled fuel cell vehicle, for example, a vehicle battery is heavily loaded during a cold start, as it must provide energy for a large load such as a compressor. Usually, such compressors are designed for high efficiency during normal operation, permitting a favorable high operating pressure. Machines having a high internal combustion ratio $C_i$ are often used for this purpose, the compression ratio $C_i$ representing the ratio of the dead volume of the compressor to the volume of the aspirated medium.

A typical compressor in a fuel cell system has a compression ratio $C_i$ in the range of from 1.3 to 2.5. The compression ratio $C_i$ is ideally equal to the pressure ratio $\Pi$ of the compressor, where n represents the ratio of the pressure on the suction side to the discharge pressure of the compressor, $C_i$ usually being somewhat smaller than the pressure ratio. More frequently used than the pressure ratio for a compressor is the work of compression; the internal work of compression, defined by the compressor, always being smaller than the external work of compression which is affected by the downstream system. A value of $\Pi=1.3$ corresponds to an excess pressure of about 300 mbar delivered by the compressor.

In normal operation, a fuel cell system is operated, for example, at a pressure ratio of $\Pi=3$. The high pressure ratio, with a resultant high compression ratio, is necessary to operate the fuel cell optimally and to achieve a favourable water balance of the fuel cell system.

Figure 1:
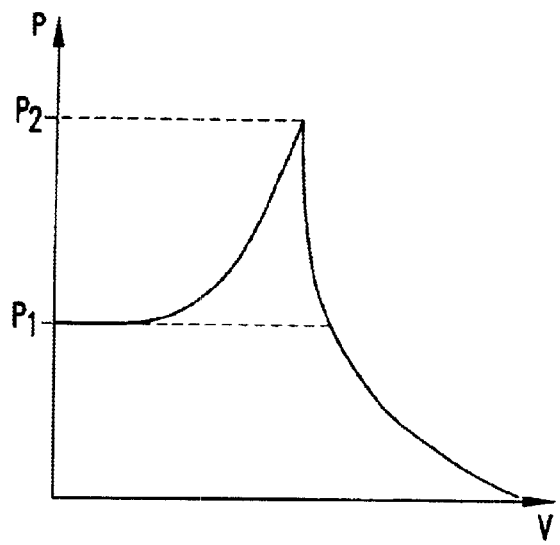
FIG. 1 shows a pressure-volume diagram for the compression ratio of a compressor in a fuel cell system according to the invention.

FIG. 1 shows a pressure-volume diagram which illustrates the pressure conditions in the cold-start case. A compressor draws in air and compresses it to a pressure $P_2$. This pressure $P_2$ preferably corresponds to the pressure that is to be achieved in normal operation for optimal fuel cell operation. In the cold-start case, however, air is preferably supplied to the gas generation system, so that the pressure downstream of the compressor drops to the value $P_1$. The area underneath the curve between $P_1$ and $P_2$ represents work which has to be produced in the cold-start case by an energy source, for example a battery, but is not utilized by the system. Not only is the energy source subjected to an unnecessary load in the cold-start case, however; in addition an undesirably high noise emission is generated in the upper pressure range between $P_1$ and $P_2$.

Figure 2:
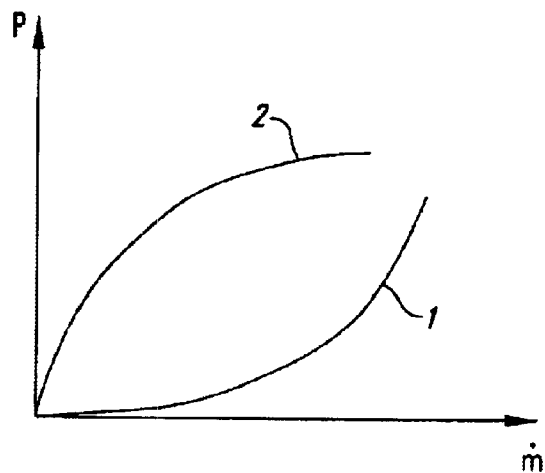
FIG. 2 is a graph which shows pressure and mass flow in the cold-start case and during normal operation.

FIG. 2 shows the pressure/mass flow trend in a preferred fuel cell system according to the invention. In the cold-start case (curve 1) the pressure increases only slowly, the trend usually following a parabola open at the top, corresponding to a standard pressure loss characteristic of a fuel cell system. With a high mass flow, the pressure rises disproportionately steeply. In normal operation (curve 2) in contrast, the pressure rises steeply even with small mass flows, and the further pressure increase for high mass flows is small.

Figure 3:
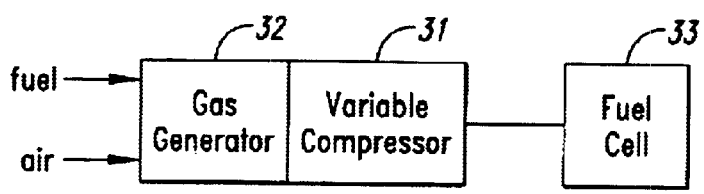
FIG. 3 is a diagram of a fuel cell system with a compressor, according to the present invention.

As shown in FIG. 3, according to the invention, a compressor 31 associated with a gas generator 32 is used to supply air to the cathode input of a fuel cell 33. The compressor has a variable internal compression ratio $C_i$ and thus allows a variable pressure ratio. Such a variable compression ratio $C_i$ can be achieved if the outlet port of the compressor is of variable size, which in turn can be achieved, for example, by opening one or more additional outlet ports in the cold-start case, resulting in a drop in the compression ratio $C_i$. In normal operation, this port or these ports are closed again, and the compression ratio $C_i$ increases.

Alternatively, the compression ratio $C_i$ can be adjusted via an essentially continuous change in the outlet port, for example by using a diaphragm to continuously clear or cover the area of an outlet port.

According to a preferred embodiment of the invention, the compressor used is a Wankel compressor which has a variable internal compression ratio $C_i$. In a further preferred embodiment, the compressor used is a screw compressor having a variable internal compression ratio $C_i$ and at least two outlets for compressed media which are at different pressure levels, as described e.g., in European patent document EP653015. One outlet is provided for a small media stream at high pressure level, and one outlet for a large media stream at a lower pressure level.

Another beneficial option is to alter the internal compression ratio $C_i$ of the compressor as a function of load; that is, to operate the compressor in the lower load range with a small internal compression ratio $C_i$ and in the upper load range at a high internal compression ratio $C_i$.

The invention not only allows energy to be saved in the cold-start phase and the load on the vehicle battery to be reduced, but also permits the efficiency of the compressor in the lower load range to be improved. Moreover, acoustic problems are avoided, especially in the lower load range, as the noise emission of the compressor is reduced in the lower load range with a small internal compression ratio $C_i$ or none at all.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel cell system comprising:
    a fuel cell unit; and
    an air supply for providing an oxygen-containing medium for the fuel cell unit; wherein
        a compressor having a variable internal compression ratio (Ci) is provided for delivery of said oxygen-containing medium.

2. The fuel cell system according to claim 1, wherein the internal compression ratio (Ci) is continuously variable as a function of operating conditions, of said fuel cell system.

3. The fuel cell system according to claim 1, wherein the internal compression ratio (Ci) can be discontinuously varied as a function of operating conditions of said fuel cell system.

4. The fuel cell system according to claim 1, wherein the compressor is a Wankel compressor.

5. The fuel cell system according to claim 1, wherein the compressor is a screw compressor having at least two outlets for media at different pressure levels.

6. A method of operating a fuel cell system having a fuel cell unit and an air supply including a compressor for providing an oxygen-containing medium to the fuel cell unit, said method comprising:
    operating the compressor with an internal compression ratio (Ci) which varies as a function of the operating conditions.

7. The method according to claim 6, wherein the compressor under cold-start conditions provides a higher flow rate of said medium, at lower pressure than during normal operation.

8. The method according to claim 6, wherein the compressor in normal operation is operated at a higher internal compression ratio (Ci) than under cold-start conditions.

* * * * *